United States Patent
Shimizu et al.

(10) Patent No.: US 6,462,910 B1
(45) Date of Patent: Oct. 8, 2002

(54) MAGNETIC DISK APPARATUS

(75) Inventors: Toshihiko Shimizu, Ibaraki-ken; Shinobu Yoshida, Tsuchiura; Tetsuya Hamaguchi, Ibaraki-ken; Keiko Watanabe, Tsuchiura; Toshihiro Arisaka, Ibaraki-ken; Kenji Mori, Tsuchiura, all of (JP)

(73) Assignee: Hitachi, Ltd, Tokyo (JP)

( * ) Notice: Subject to any disclaimer, the term of this patent is extended or adjusted under 35 U.S.C. 154(b) by 0 days.

(21) Appl. No.: 09/386,475

(22) Filed: Aug. 31, 1999

Related U.S. Application Data

(62) Division of application No. 08/932,919, filed on Sep. 18, 1997, now Pat. No. 5,999,369.

(30) Foreign Application Priority Data

Sep. 20, 1996 (JP) .............................................. 8-249760

(51) Int. Cl.$^7$ ........................... G11B 5/48; G11B 21/16; G11B 21/21
(52) U.S. Cl. .................................. 360/244.8; 360/244.2
(58) Field of Search ........................... 360/244.2, 244.5, 360/244.8, 244.9

(56) References Cited

U.S. PATENT DOCUMENTS

| | | | |
|---|---|---|---|
| 4,731,685 A | 3/1988 | Orcutt | |
| 5,142,424 A | 8/1992 | Hatamura | |
| 5,237,475 A | 8/1993 | Kazama et al. | |
| 5,243,482 A | 9/1993 | Yamaguchi et al. | |
| 5,381,288 A | * 1/1995 | Karam, II | 360/104 |
| 5,471,734 A | * 12/1995 | Hatch et al. | 29/603.03 |
| 5,652,684 A | 7/1997 | Harrison | |
| 5,682,669 A | 11/1997 | Harrison et al. | |
| 5,734,525 A | 3/1998 | Girard | |
| 5,777,826 A | 7/1998 | Tsuchida et al. | |
| 5,999,369 A | * 12/1999 | Shimizu et al. | 360/104 |
| 6,088,192 A | * 7/2000 | Riener et al. | 360/104 |

FOREIGN PATENT DOCUMENTS

| | | |
|---|---|---|
| JP | 5-189906 | 7/1993 |
| JP | 6-150598 | 5/1994 |

OTHER PUBLICATIONS

Copy of Patent Application Serial No. 08/692,394, referenced in child application, now US Patent No. 6,088,192, issued Jul. 11, 2000, with a filing date of Oct. 24, 1996, which claimed priority to U.S. patent application No. 08/692,394, filed Aug. 5, 1996, now abandoned.*

"Analysis of Head Positioning Error Caused by Disk Surface Flutter", Integrated National Convention of the Institute of Electronics and Communication Engineers of Japan, 1984.

"Non–repeatable Flutter of Magnetic Recording Disks", IEEE Transactions on Magnetics, Sep. 1986.

* cited by examiner

Primary Examiner—William Klimowicz
(74) Attorney, Agent, or Firm—Antonelli, Terry, Stout & Kraus, LLP

(57) ABSTRACT

In magnetic disk structures having a high density, positioning errors (generally referred to as "flutter error") occur due to a fluctuation of a magnetic disk. As a result, reading precision deteriorates. This is a significant problem in realizing a large capacity for a magnetic disk apparatus. This can be resolved by providing a magnetic apparatus such that a suspension which holds a slider having a magnetic head at one end and which is attached to a supporting arm at the other end is inclined so that an interval between the suspension and the magnetic disk is small on the inner rim side and is large on the outer rim side with this arrangement, the occurrence of the positioning error due to the fluctuation of a deformation of the magnetic disk is reduced, thereby enabling a high density recording of the magnetic disk.

6 Claims, 7 Drawing Sheets

INNER PERIPHERAL SIDE ←→ OUTER PERIPHERAL SIDE

INNER PERIPHERAL SIDE ← → OUTER PERIPHERAL SIDE

INNER PERIPHERAL SIDE ← → OUTER PERIPHERAL SIDE

MAGNETIC DISK APPARATUS

CROSS REFERENCE TO RELATED APPLICATION

This is a divisional of U.S. application Ser. No. 08/932,919, filed, Sep. 18, 1997 now U.S. Patent No. 5,999,369.

BACKGROUND OF THE INVENTION

The present invention relates to a magnetic disk apparatus and, more particularly, to a magnetic disk apparatus of a large capacity in which a recording density in a radial direction is increased.

Typical examples of a magnetic disk apparatus and a magnetic head suspension which have been hitherto put into practical use are disclosed in JP-A-55-22296. In the foregoing prior art, the suspension consists of a loading arm and a gimbal. A slider on which a magnetic head is mounted is fixed to the gimbal by adhering or the like. A projection called a dimple is provided for the gimbal or a front edge portion of the loading arm and the slider can be freely rotated in an outer direction of a disk surface by setting a top of the dimple as a supporting point. The loading arm has a spring portion on the side of a supporting arm so that the slider can trace the disk surface, thereby allowing a flexible structure to be provided in the vertical direction of a disk surface. In order to apply a predetermined load to the slider, the spring portion of the loading arm is bent along the width direction and is attached thereto, so that the loading arm and disk surface are set to an almost parallel state to thereby apply a load to the slider.

In the magnetic disk apparatus of a disk diameter of, particularly, 5.25" or less, in order to miniaturize a size of the apparatus and reduce an inertial mass upon accessing, there is ordinarily used an in-line system for arranging the supporting arm and suspension in line and positioning the supporting arm onto a predetermined track by rotating.

In the magnetic disk apparatus, in order to realize a large capacity, the number of tracks in the radial direction increases year after year and positioning precision becomes ever more important in accordance with the increase. However, a positioning error (hereinbelow, referred to as a flutter error) due to deflection fluctuation (hereinbelow, referred to as flutter) in the disk tends to occur with the increase in the number of tracks. This creates a problem that an adverse influence is exerted on positioning precision.

A mechanism of the flutter error will now be described hereinbelow with reference to a low fluctuation mode having no circular segment which is an actual problem.

When flutter occurs, a deflection as a displacement in the disk surface outer direction and a deflection angle in the radial direction of the disk surface simultaneously occur. When the disk is curved on the slider side by the deflection angle, tracks on the disk surface are deviated on the inner peripheral side. For example, in the prior art as mentioned above, the suspension is flexible in the vertical direction of the disk in a still state and is rigid in the radial direction. Therefore, the top of the dimple moves on a line in the vertical direction of the disk in the still state. Since the slider rotates at the top of the dimple as a center, a read/write gap (hereinbelow, referred to as a gap) of the magnetic head located on the disk surface side of the slider is deviated on the outer peripheral side when the disk is curved on the slider side. As for the above-mentioned phenomenon, when the disk is curved on the side opposite to the slider as well, the deviations of the tracks and gap occur in the similar mechanism, though the directions to be deviated are opposite. That is, when the disk is curved on the slider side, the tracks are deviated on the inner peripheral side and the gap is curved on the outer peripheral side. When the disk is curved on the side opposite to the slider, the tracks are curved on the outer peripheral side and the gap is deviated on the inner peripheral side. The sum of the deviations of the tracks and gap appear as a flutter error.

As seen in Seo et al., "Analysis of Head Positioning Error Caused by Disk Surface flutter" Integrated National Convention of The Institute of Electronics and Communication Engineers of Japan, 1984 or Gill Bouchard et al., "Non-Repeatable Flutter of Magnetic Recording Disks", IEEE Transactions on Magnetics, Sept., 1986, a generation mechanism of the flutter error has been known but an effective solving method has not previously been proposed.

OBJECT AND SUMMARY OF THE INVENTION

It is an object of the present invention to provide a magnetic disk apparatus of a large capacity by improving positioning precision and raising track density in the radial direction by reducing flutter error.

The above object of the present invention is accomplished by constituting a magnetic disk apparatus having a suspension which holds at one end a magnetic head for recording and reproducing information while relatively moving on a surface of a magnetic disk which rotates and which is fixed to a supporting arm at the other end, and in which the supporting arm and the suspension are arranged in line and the supporting arm is positioned to a predetermined position by rotating in such a manner that when the magnetic disk is curved on the side of a slider, the slider is moved on the inner peripheral side and, when the magnetic disk is curved on the side opposite to the slider, the slider is moved on the outer peripheral side.

Therefore, a movement of a dimple top is restricted not to a vertical line of a disk surface when the disk is still but to a line which is inclined on the inner peripheral side of the disk as seen from the slider side. Consequently, when the disk is curved on the slider side, the slider is moved on the inner peripheral side and, when the disk is curved on the side opposite to the slider, the slider is moved on the outer peripheral side. Since the direction is opposite to the direction in which the above flutter error occurs, the suspension is attached to the supporting arm by providing a predetermined inclination, so that the flutter error can be corrected.

According to the invention, therefore, since the flutter error can be reduced, a positioning precision is improved and a track density in the radial direction can be raised, so that the magnetic disk apparatus of a large capacity can be realized.

DETAILED DESCRIPTION OF THE PREFERRED EMBODIMENTS

Embodiments of the invention will now be described in detail hereinbelow with reference to the drawings.

Figure 1:
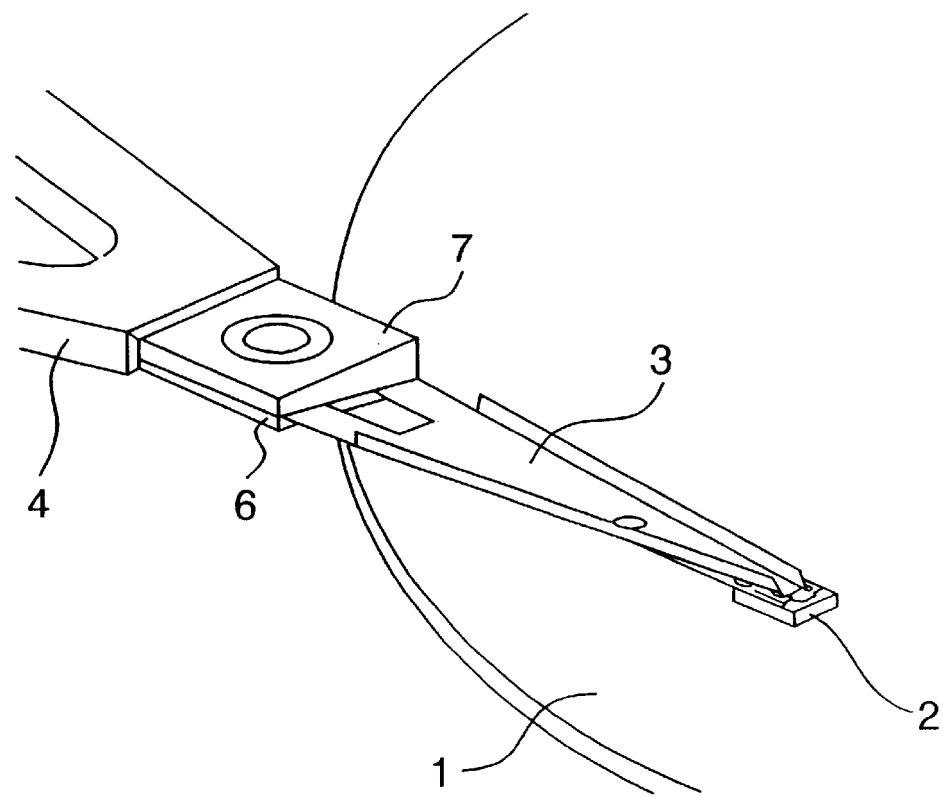
FIG. 1 is a perspective view of a magnetic disk apparatus of a first embodiment of the invention.
Figure 2:
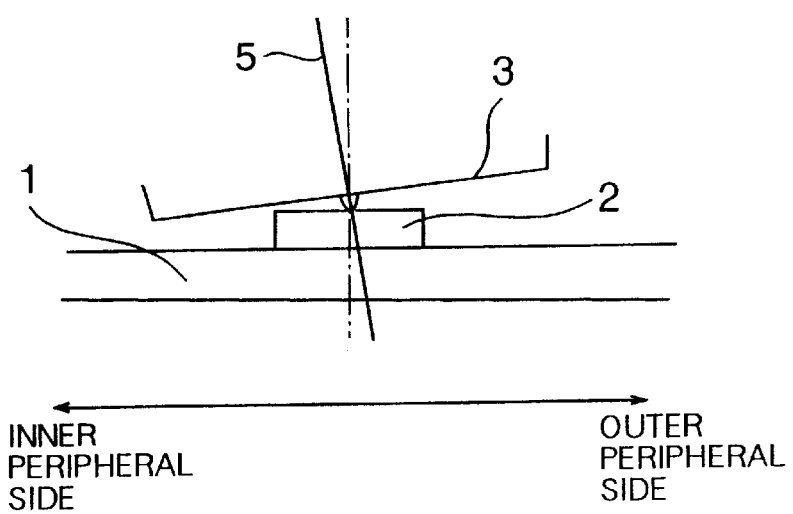
FIG. 2 is a front view of the magnetic disk apparatus of the first embodiment of the invention.

FIG. 1 is a perspective view of a magnetic disk apparatus to which the invention is applied, and FIG. 2 is a front view of that apparatus.

In FIG. 1, a slider 2 mounting a magnetic head (not shown) which glides above a magnetic disk is attached to a front edge portion of a suspension 3 by adhering or the like. The suspension 3 is fixed to a front edge portion of a supporting arm 4. According to the invention, as shown in FIG. 2, the suspension 3 is inclined so that an interval between the suspension 3 and a magnetic disk 1 is small on the inner peripheral side of the magnetic disk and is large on the outer peripheral side with respect to a center line of the suspension 3 in the longitudinal direction. Since the front edge portion of the suspension 3 is moved on a suspension front edge locus 5 in FIG. 2, therefore, when the magnetic disk is curved on the slider 2 side, the front edge portion of the suspension 3 and the slider 2 are moved on the inner peripheral side. Similarly, when the magnetic disk 1 is curved on the side opposite to the slider 2, the front edge portion of the suspension 3 and slider 2 are moved on the outer peripheral side. Since the operation is reverse to the direction of an occurrence of the foregoing flutter error, the suspension 3 is attached to the supporting arm 4 by inclining at a predetermined angle, so that the flutter error can be corrected and reduced.

In the apparatus as shown in FIG. 1, one disk has only a suspension and a head, while the conventional disk apparatus has the structure of a plurality of disks laminated one another. Thus, the suspension or head may be provided with respect to each disk.

A reason why the flutter error can be prevented by only inclining the suspension will now be explained with reference to the principle of occurrence of the flutter error and FIGS. 12 to 14.

Figure 12:
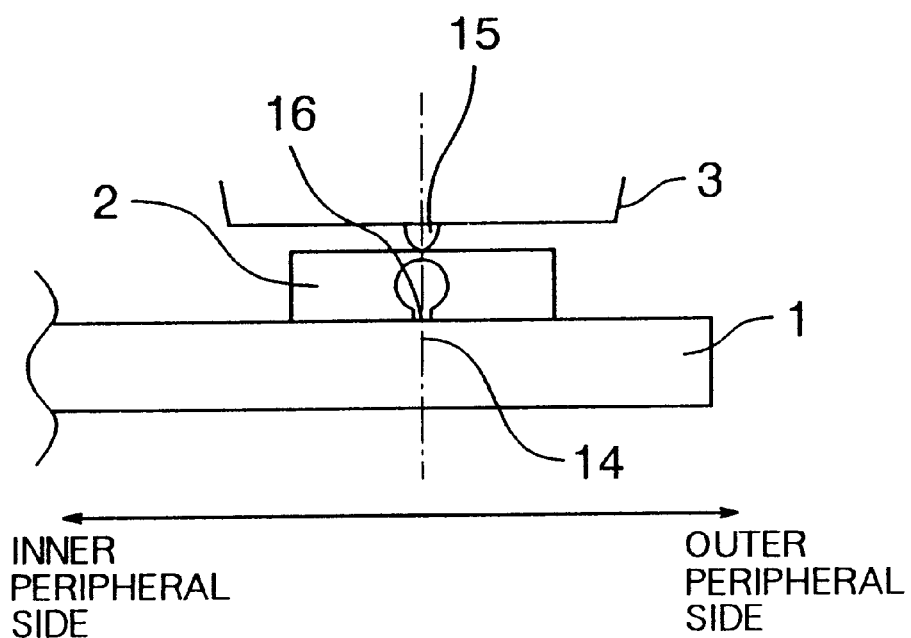
FIG. 12 is a view showing a relation between the disk and slider when no flutter error exists.

In FIG. 12, while the magnetic disk apparatus performs a recording or reproducing operation, a normal recording position 14 on a surface of the magnetic disk 1 and a gap 16 with the magnetic head mounted on the slider 2 are set to almost the same location in a predetermined position on the magnetic disk 1. The slider 2 is held so as to be freely rotated by the suspension 3 via a dimple 15.

Figure 13:
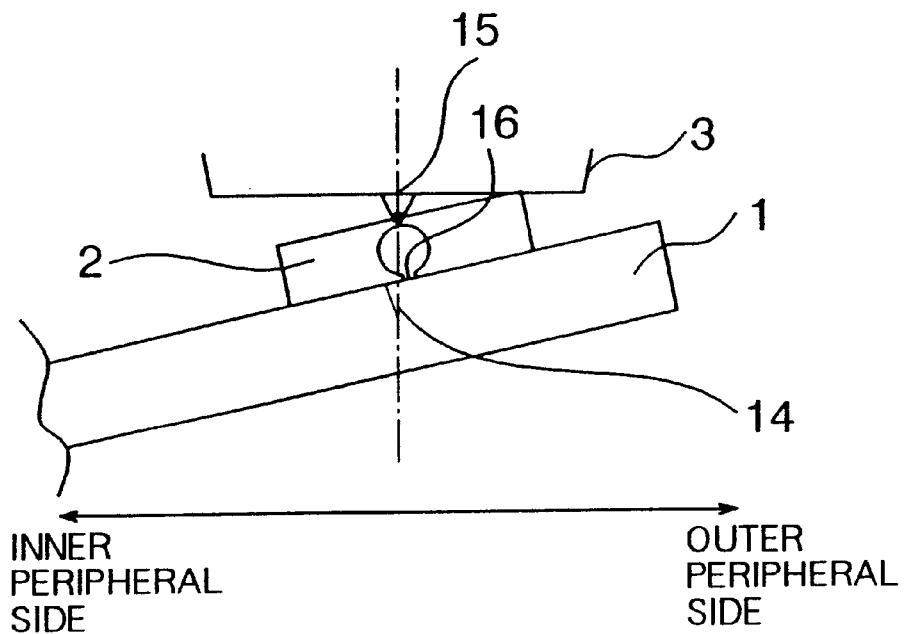
FIG. 13 is a view for explaining the principle of occurrence of the flutter error.

Although FIG. 12 shows a state in which the magnetic disk 1 is not deformed, as shown in FIG. 13, the magnetic disk 1 is curved in the vertical direction of the disk surface and a deflection angle in the radial direction occurs, so that the normal recording position 14 on the surface of the magnetic disk 1 is deviated on the inner peripheral side by the foregoing bent angle. On the other hand, the suspension 3 is made flexibly in the disk surface vertical direction so that the slider 2 can follow a waviness or the like of the magnetic disk surface and is made rigidly in the radial direction so as to be able to certainly access to the normal recording position 14. Therefore, a top of the dimple 15 is moved on the line in the vertical direction of the disk surface in a still state. The slider 2 is rotated as shown in FIG. 12, the gap 16 of the slider 2 is deviated on the outer rim side. As a result, the sum of a deviation amount on the inner peripheral side of the magnetic disk 1 and a deviation amount on the outer peripheral side of the gap 16 becomes the flutter error. FIG. 13 shows a state in which the magnetic disk 1 is curved on the slider 2 side. Even when the magnetic disk 1 is curved on the side opposite to the slider 2, by a similar phenomenon, the normal recording position 14 of the magnetic disk 1 is deviated on the outer rim side and the gap 16 is deviated on the inner peripheral side, thereby generating the flutter error.

Figure 14:
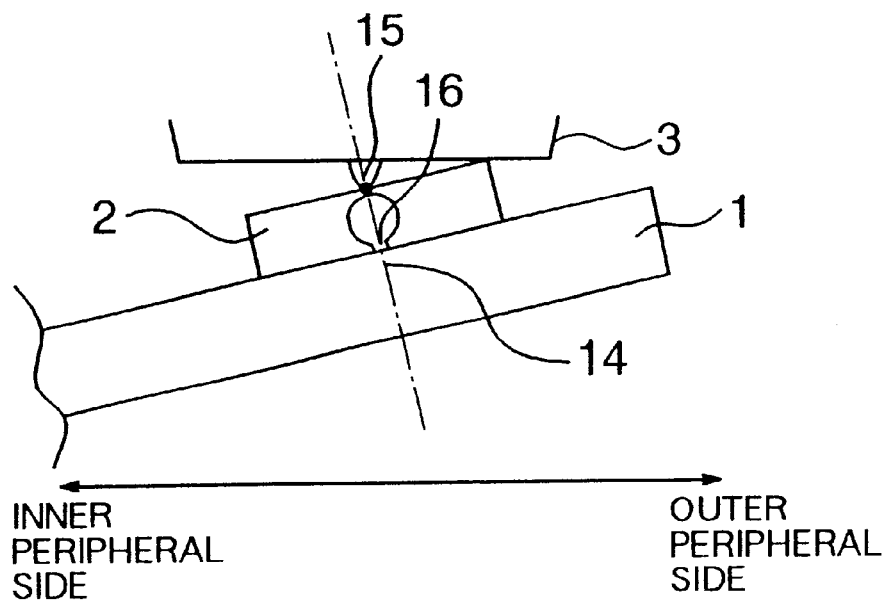
FIG. 14 is a view for explaining the principle to dissolve the flutter error.

FIG. 14 shows the principle to correct the fore-going flutter error. It is assumed that the suspension has previously been set so as to provide a predetermined inclination on the inner peripheral side of the magnetic disk, when the magnetic disk 1 is curved to a side of the slider 2, the slider 2 is moved on the inner peripheral side, and when the magnetic disk 1 is curved on the side opposite to the slider 2, the slider 2 is moved on the outer peripheral side. That is, when the rotational center of the slider 2 is restricted onto a locus shown in FIG. 14, the positions of the slider 2 and gap 16 are moved in the direction opposite to the direction in which the flutter error shown in FIG. 13 occurs, namely, the positions are moved in the direction in which the flutter error is not automatically generated.

A specific embodiment of the invention will now be described.

Ordinarily, the suspension 3 is attached to the supporting arm 4, is sandwiched by a mount 6, and is fixed by caulking the mount 6 and supporting arm 4. There is raised a problem that an interval between the magnetic disk 1 and mount 6 is reduced because the suspension 3 should be wholly inclined and fixed to the supporting arm 4. Consequently, there is a fear that a minimum necessary interval between the magnetic disk 1 and mount 6 cannot be maintained due to a deformation or a manufacturing tolerance of the magnetic disk 1, a deformation of the supporting arm 4, or the like. FIG. 1 shows an assembly diagram in which a predetermined inclination is provided in an attaching portion for the suspension 3 on the supporting. arm side, one side of a projecting portion on a side of the mount 6 is projected long in accordance with the inclination of the supporting arm, thereby providing a predetermined inclination in the suspension 3. According to the method, it is difficult to obtain a processing precision of the projecting portion on the side of the mount 6. Therefore, a flat plate portion of the mount 6 is formed so as to be tapered in such a manner that a portion on the inner peripheral side is thin and a portion on the outer peripheral side is thick and a suspension attaching portion 7 of the supporting arm 4 is formed so as to be tapered in such a manner that a portion on the inner rim side is thick and a portion on the outer peripheral side is thin, thereby thinning a whole thickness, so that the interval between the magnetic disk 1 and mount 6 is maintained. As mentioned above, by constructing so as to support by providing an inclination in the supporting portion, the manufacturing is easily made and the magnetic disk apparatus of a desired precision can be realized.

Figure 3:
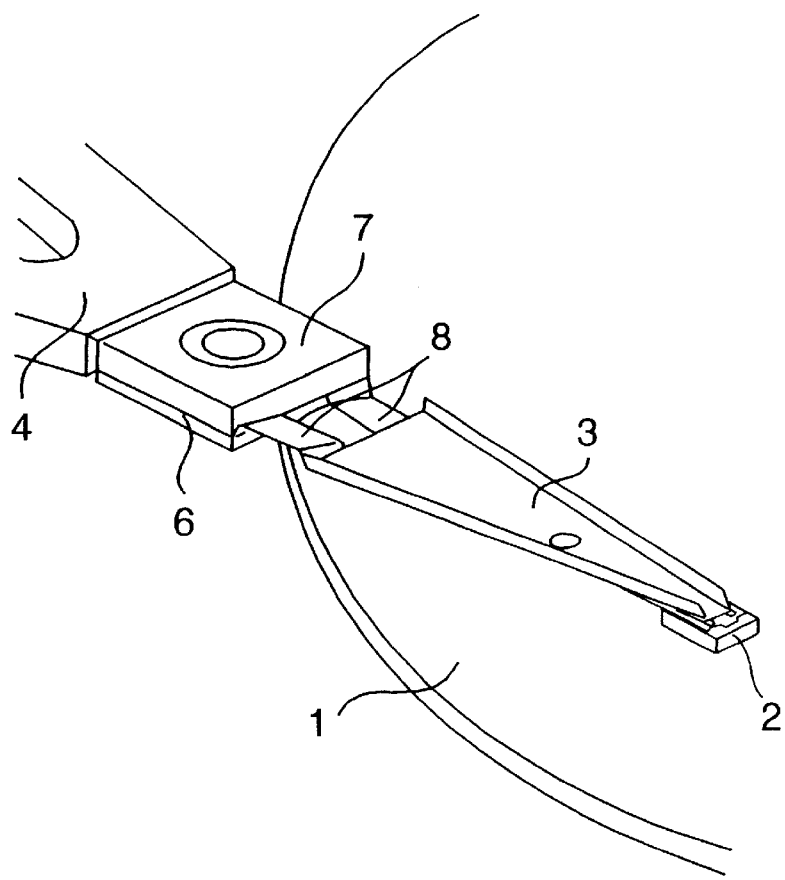
FIG. 3 is a perspective view of a magnetic disk apparatus of a second embodiment of the invention.
Figure 4:
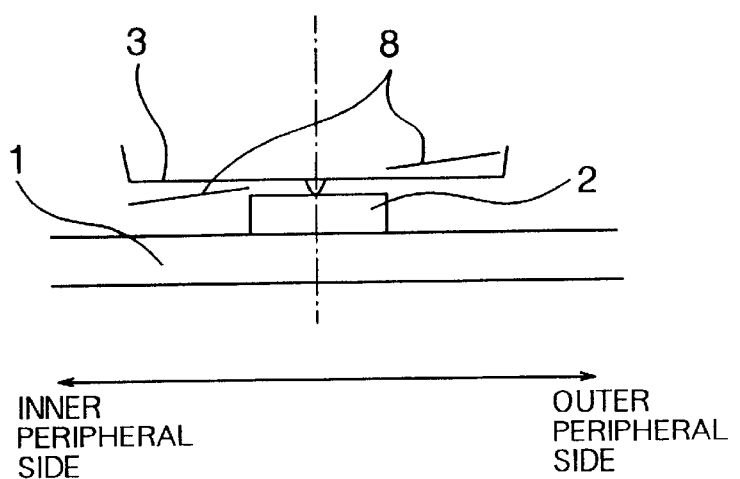
FIG. 4 is a front view of the magnetic disk apparatus of the second embodiment of the invention.

FIG. 3 is a perspective view showing the second embodiment of the invention and FIG. 4 is a front view of the second embodiment.

In the embodiment in FIG. 1, an angle of tapering of the mount 6 is determined in accordance with an angle to incline the suspension 3. In order to increase the number of disks for the purpose of realizing a large capacity of the magnetic disk apparatus, however, the disk interval ought to be further reduced. In this case, in the mount 6 with a taper, the thickness of mount necessary to maintain a rigidity cannot be assured and, simultaneously, a deflection or the like of the mount 6 itself causes a problem. In the embodiments in FIGS. 3 and 4, in order to set an interval between a spring portion 8 for generating a predetermined load onto the slider 2 and the magnetic disk 1 to be small on the inner peripheral side and be large on the outer peripheral side, only the spring portion 8 is inclined with respect to a center line in the longitudinal direction of the suspension 3 as shown in FIG. 4. Since the front edge locus of the suspension 3 is decided by the spring portion 8 as a principal factor, the effect similar to the first embodiment can be also obtained in the embodiments in FIGS. 3 and 4 and it can cope with even a case where the disk interval is reduced because the mount 6 or suspension attaching portion 7 of the supporting arm 4 can be set in parallel with the magnetic disk 1.

Figure 5:
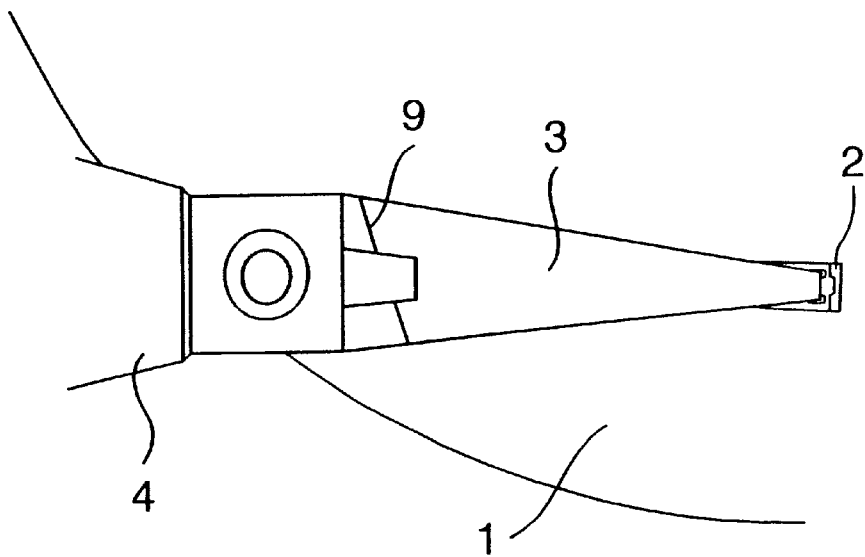
FIG. 5 is a top view of a magnetic disk apparatus of a third embodiment of the invention.
Figure 6:
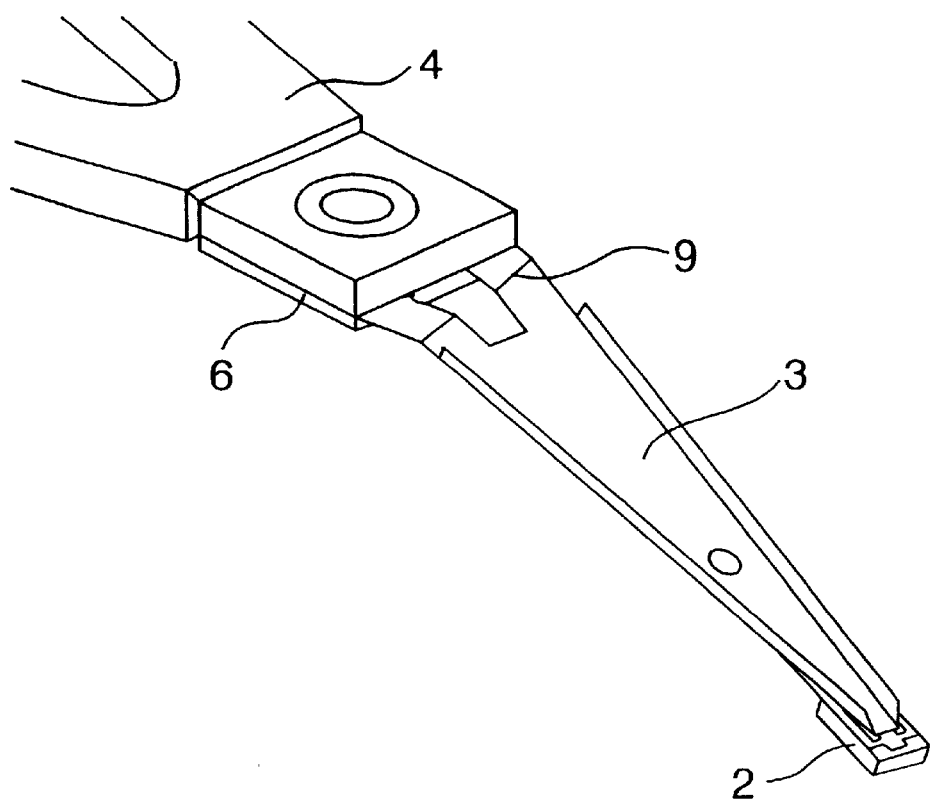
FIG. 6 is a perspective view showing a non-mounting state of a magnetic head suspension of the third embodiment of the invention.

FIG. 5 is a top view showing the third embodiment of the invention and FIG. 6 is a diagram showing a non-mounting state.

In the embodiment in FIGS. 3 and 4, a deformation of the spring portion 8 by bending becomes larger than that of a normal suspension, so that there is a problem that the rigidity in the direction of the width of suspension 3 as a rigidity in the direction of accessing deteriorates. The embodiment shown in FIGS. 5 and 6 provides with means for restraining the deformation by bending in the spring portion 8 of the suspension 3 to the same degree as that in the normal case and correcting the flutter error. The embodiment in FIGS. 5 and 6 differs from the embodiment in FIGS. 3 and 4 with respect to a point that the bending process for the spring portion 8 of the suspension 3 is performed in only one location similar to the normal case and a deformation amount is also similar to the normal case. The bending process for the spring portion 8 is executed near the supporting arm 4 on the inner peripheral side and is performed along a bending line 9 away from the supporting arm 4 on the outer peripheral side.

As shown in FIG. 6, therefore, the slider 2 is displaced on the outer peripheral side in the non-mounting state. Since the suspension 3 is returned to be almost parallel with the magnetic disk 1 and is used upon mounting, a displacement amount on the outer peripheral side of the slider 2 is reduced. That is, when the magnetic disk 1 is moved in the direction to be curved in the direction of the slider 2, the slider 2 is moved on the side of the suspension 3, namely, in the inner peripheral side.

Figure 7:
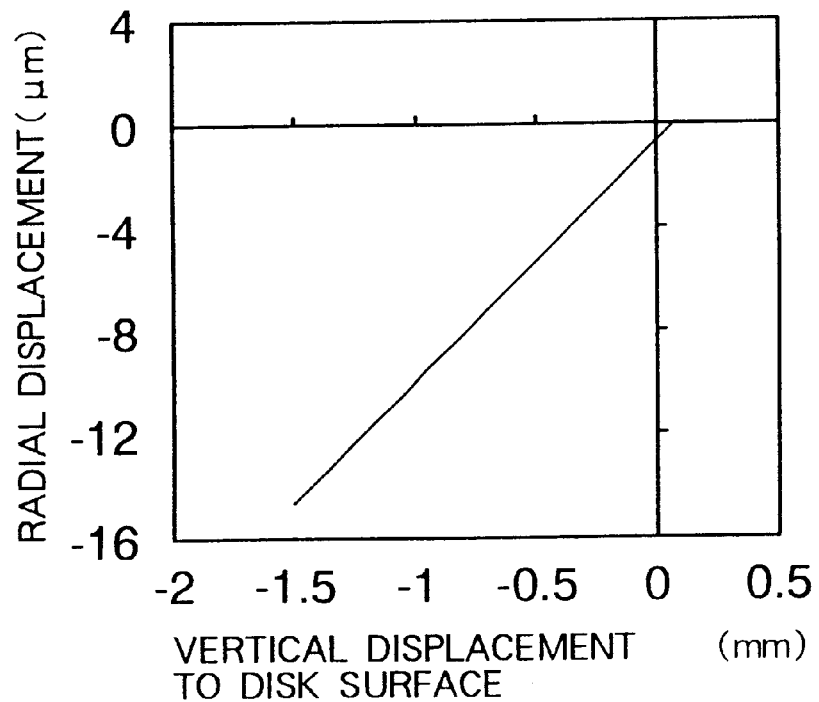
FIG. 7 is a diagram showing a locus of a front edge of the magnetic head suspension of the third embodiment of the invention.

FIG. 7 shows a locus of the front edge of the suspension 3 from the non-mounting state to the mounting state by using a large deformation analysis of a finite element method in order to confirm the operation. In FIG. 7, an axis of abscissa denotes a displacement of the front edge of the suspension 3 in the vertical direction of the magnetic disk 1, an axis of ordinate denotes a displacement in the radial direction, and an origin indicates the mounting state. As shown in FIG. 7, the front edge of the suspension 3 is moved on the inner rim side as being lifted from the non-mounting state, so that a locus similar to the case in FIG. 1 is obtained. That is, since the movement is contrary to the direction of occurrence of the flutter error, the flutter error can be corrected and reduced by the method shown in FIGS. 5 and 6 without deteriorating the rigidity in the width direction of the suspension 3.

Figure 8:
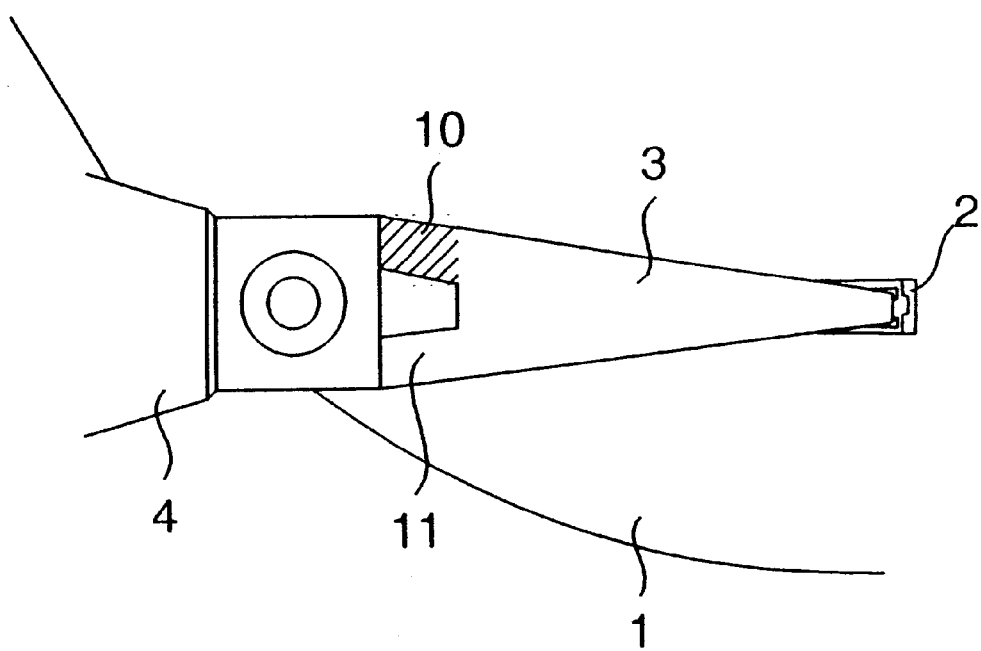
FIG. 8 is a top view of a magnetic disk apparatus of a fourth embodiment of the invention.

FIG. 8 is a top view showing the fourth embodiment of the invention. In the embodiment in FIG. 5, there is provided an advantage that the rigidity in the width direction of the suspension 3 is not deteriorated. When the displacement in the radial direction for a deflection amount of the magnetic disk 1 is increased, however, there is raised a problem that a length of the spring portion cannot be increased in order to maintain a high rigidity of the suspension 3 in the radial direction, so that a large angle of the bending line 9 for the width direction cannot be provided. In the embodiment in FIG. 8, a thickness of inner peripheral side spring portion 10 of the suspension 3 is thinned by half-etching or the like, so that a rigidity on the inner peripheral side of the suspension 3 is set to be smaller than that on the outer peripheral side. Accordingly, when the magnetic disk 1 is curved on the slider side, the inner peripheral side spring portion 10 is deformed larger than a portion on the outer peripheral side because the rigidity of the spring portion 10 at the inner peripheral side 10 is small. Therefore, it results in a state in which the portion on the inner peripheral side is contracted and the suspension 3 is inclined on the inner peripheral side as a whole. Consequently, the slider 2 is moved on the inner peripheral side. On the contrary, when the magnetic disk 1 is curved in the side opposite to the slider, a deflective deformation occurred in a step of setting the suspension 3 from the non-mounting state to the mounting state is released, so that a deformation in the direction opposite to the direction of the foregoing deformation occurs and the slider 2 is moved on the outer peripheral side. Since the flutter error can be corrected and reduced and a difference between the rigidities of the inner and outer peripheries can be arbitrarily changed by controlling a thickness of plate, the displacement in the radial direction for the deflection amount of the magnetic disk 1 can be increased.

Figure 9:
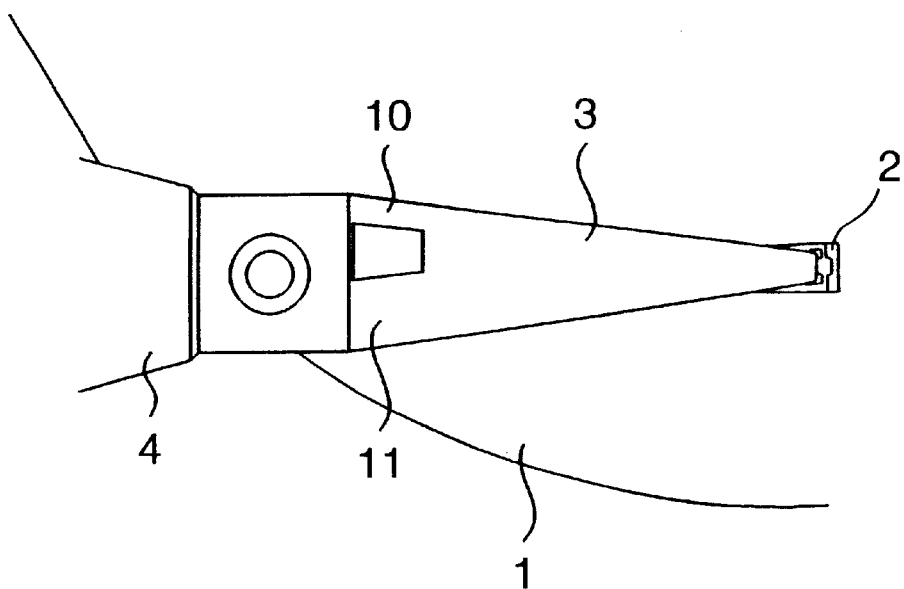
FIG. 9 is a top view of a magnetic disk apparatus of a fifth embodiment of the invention.

FIG. 9 shows a top view showing the fifth embodiment of the invention. In the embodiment in FIG. 8, the plate thickness of the spring portion 10 at the inner peripheral side is thinned by half-etching or the like, thereby obtaining the difference between the rigidities of the inner and outer peripheries. Since a manufacturing variation in plate thickness is large by half-etching, however, a variation in rigidity occurs. In the embodiment in FIG. 9, however, the width of inner peripheral side spring portion 10 is reduced and a width of the spring portion 11 at the outer peripheral side is increased, thereby obtaining the rigidity difference. Since the difference between the rigidities of the inner and outer peripheries can be stably set, consequently, the flutter error can be corrected at a high precision and be reduced.

Figure 10:
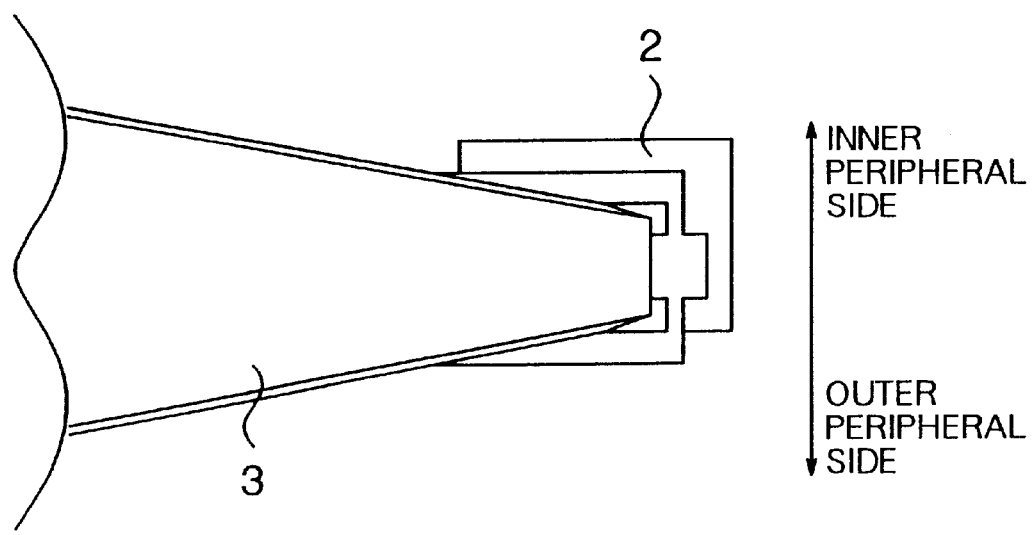
FIG. 10 is a top view of a magnetic disk apparatus of a sixth embodiment of the invention.

FIG. 10 is a top view showing the sixth embodiment of the invention. In the first, second, and third embodiments, for construction, an initial moment in the direction of rolling in which the longitudinal direction of the suspension 3 is set to an axis of rotation occurs in the direction in which the inner peripheral side of the slider 2 is pressed to the magnetic disk 1. Therefore, there is raised a problem that a floating amount on the inner peripheral side of the slider 2 deteriorates and, in the worst case, the magnetic disk 1 is come into contact with the slider 2 and they are damaged, so that a reliability of the magnetic disk apparatus deteriorates.

In the embodiment in FIG. 10, a moment to press the outer rim side of the slider 2 onto the magnetic disk 1 is generated by deviating a load point on the outer peripheral side and the foregoing initial moment can be canceled, so that the floating amount on the inner peripheral side of the slider 2 doesn't deteriorate. Consequently, the first, second, and third embodiments can be realized without deteriorating the reliability of the magnetic disk apparatus.

Figure 11:
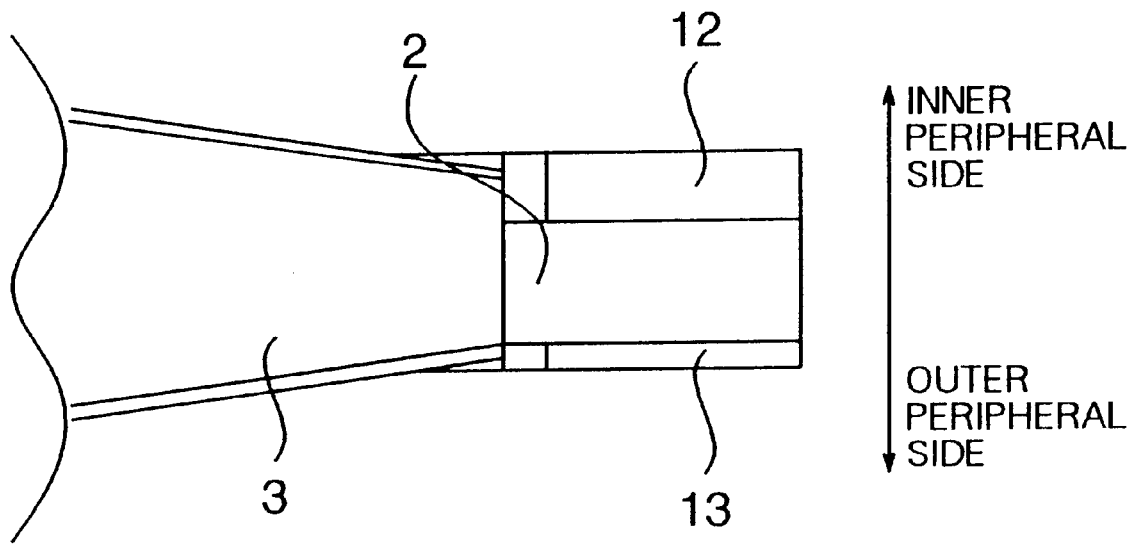
FIG. 11 is a view showing a floating surface of a magnetic head slider of a seventh embodiment of the invention.

FIG. 11 is a view of a floating surface of the slider 2 showing the eighth embodiment of the invention. In the embodiment in FIG. 10, the initial moment in the rolling direction by the suspension 3 is canceled by deviating the load point on the outer peripheral side. In the embodiment in FIG. 10, however, a deviation in the radial direction occurs in a position of the center of gravity of the slider 2 and the front edge portion of the suspension 3. Consequently, when the accessing operation is performed or a disturbance fluctuation occurs, a fluctuation in the yawing direction in which the rolling direction or direction perpendicular to the magnetic disk 1 is set to the axis of rotation occurs in the slider 2, so that a fluctuation in floating amount or a decrease in positioning precision occurs.

In the embodiment in FIG. 11, an area of an inner peripheral floating surface 12 of the slider 2 is increased and an area of an outer peripheral floating surface 13 is reduced, thereby canceling the foregoing initial moment in the rolling direction. Since the load point is arranged to the position of the center of gravity of the slider 2, therefore, the above fluctuation doesn't occur and the variation in floating amount or decrease in positioning precision doesn't occur.

According to the invention, since the flutter error can be reduced, the positioning precision is improved and the track density in the radial direction can be raised, so that the magnetic disk apparatus of a large capacity can be realized.

What is claimed is:

1. A magnetic disk apparatus having a magnetic disk which rotates and a suspension which holds at one end a magnetic head for recording and reproducing information while relatively moving on a surface of said magnetic disk, which is fixed to a supporting arm at another end, and which has a spring portion for applying a predetermined load to a slider, said supporting arm and said suspension being arranged in line, and said supporting arm being positioned to a predetermined position by rotating and being substantially parallel to the surface of the magnetic disk, wherein said spring portion is provided with a bent portion formed in said spring portion near the supporting arm at an inner peripheral side of the magnetic disk and along a straight line to be farther away from the supporting arm at an outer peripheral side of the magnetic disk to offset movement of the magnetic disk caused by flutter of the magnetic disk.

2. A magnetic disk apparatus having a suspension which holds at one end a slider having a magnetic head for recording and reproducing information while relatively moving on a surface of a rotating magnetic disk and which is fixed to a supporting arm at the other end, said supporting arm and said suspension being arranged in line, and said supporting arm being positioned to a predetermined position by rotating and being substantially parallel to the surface of the magnetic disk, wherein said suspension for applying a load to said slider is bent near said supporting arm on an inner peripheral side and along a line to be farther away from said supporting arm on an outer peripheral side to be at an oblique angle to the supporting arm to offset movement of the magnetic disk caused by flutter.

3. An apparatus according to claim 2, wherein a load point of said slider is deviated on the outer peripheral side.

4. An apparatus according to claim 2, wherein an area of a floating surface of said slider is large in the inner peripheral side and is small on the outer peripheral side.

5. A magnetic disk apparatus having a suspension which holds at one end a magnetic head for recording and reproducing information while relatively moving on a surface of a rotating magnetic disk, which is fixed to a supporting arm at another end and has a spring portion for applying a predetermined load onto a slider, said supporting arm being substantially parallel to the surface of the magnetic disk, wherein an angle between said supporting arm and said suspension is smaller than 90°, and said supporting arm is positioned to a predetermined position by rotating, and said spring portion is provided with a bent portion formed in said spring portion near the supporting arm at an inner peripheral side of the magnetic disk and along a straight line to be farther away from the supporting arm at an outer peripheral side of the magnetic disk to offset movement of the magnetic disk caused by flutter of the magnetic disk.

6. A magnetic disk apparatus having a suspension which holds at one end a slider magnetic head for recording and reproducing information while relatively moving on a surface of a rotating magnetic disk and which is fixed to a carriage supporting arm at another end, said supporting arm being substantially parallel to the surface of the magnetic disk, wherein an angle between said supporting arm and said suspension is smaller than 90°, and said supporting arm is positioned to a predetermined position by rotating, and said suspension for applying a load to said slider is bent near said carriage supporting arm on an inner peripheral side of said magnetic disk and along a line to be farther away from said carriage supporting arm on an outer peripheral side of said magnetic disk to offset movement of the magnetic disk caused by flutter of the magnetic disk.

* * * * *